E. SCHNEIDER.
REMOVABLE BOGIE FOR TRAILERS.
APPLICATION FILED JULY 30, 1917.

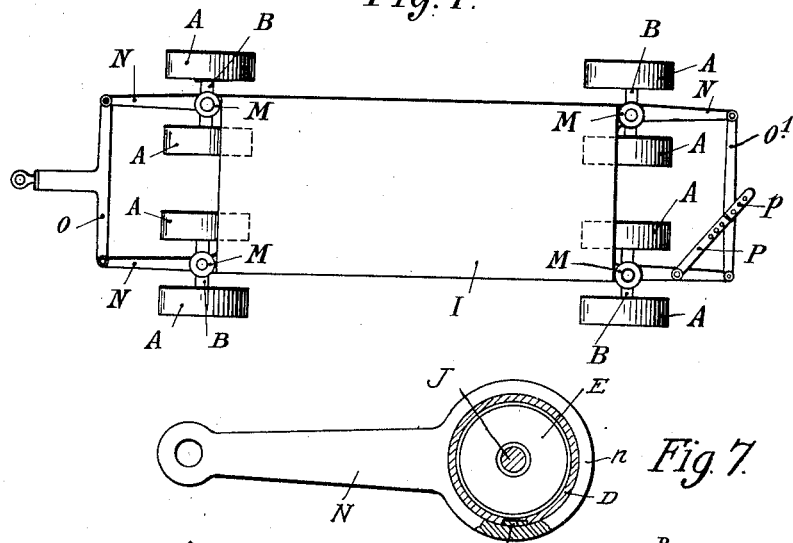
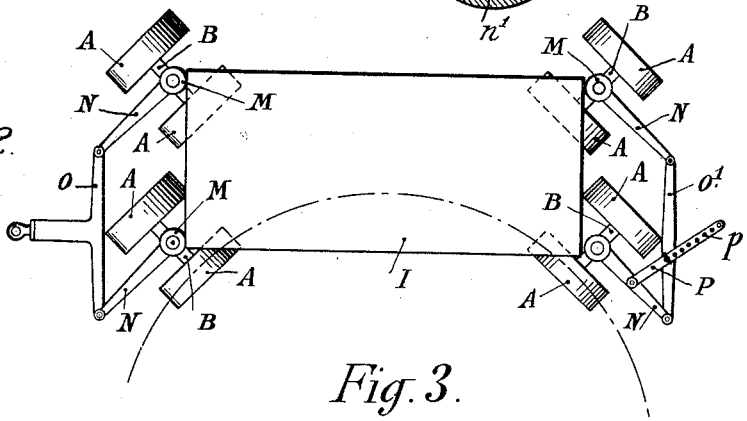
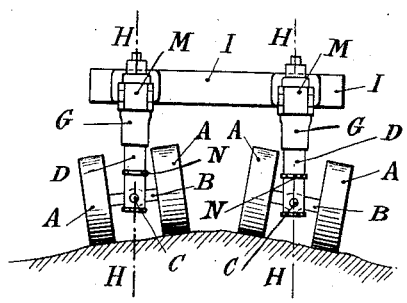

1,340,414.

Patented May 18, 1920.
6 SHEETS—SHEET 2.

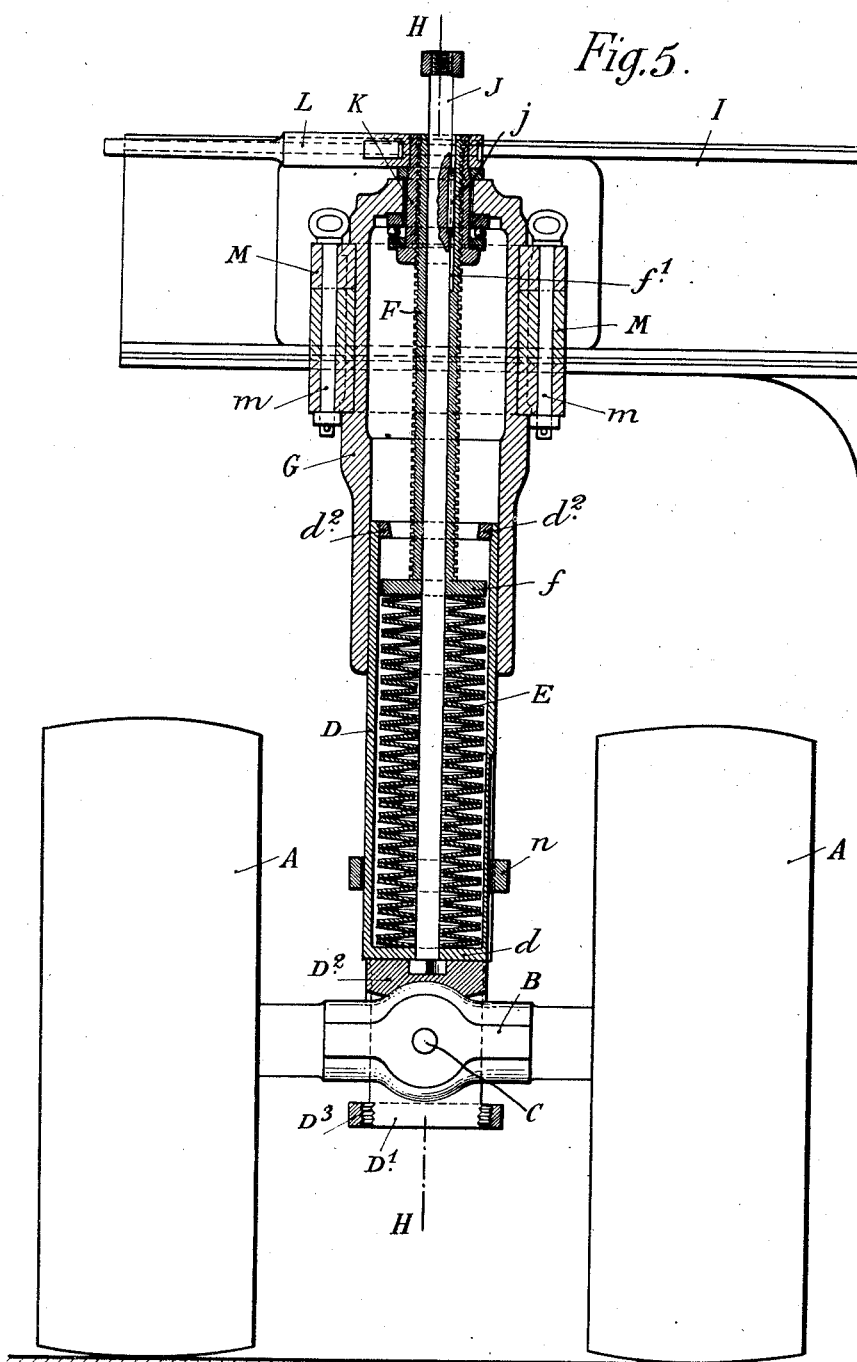

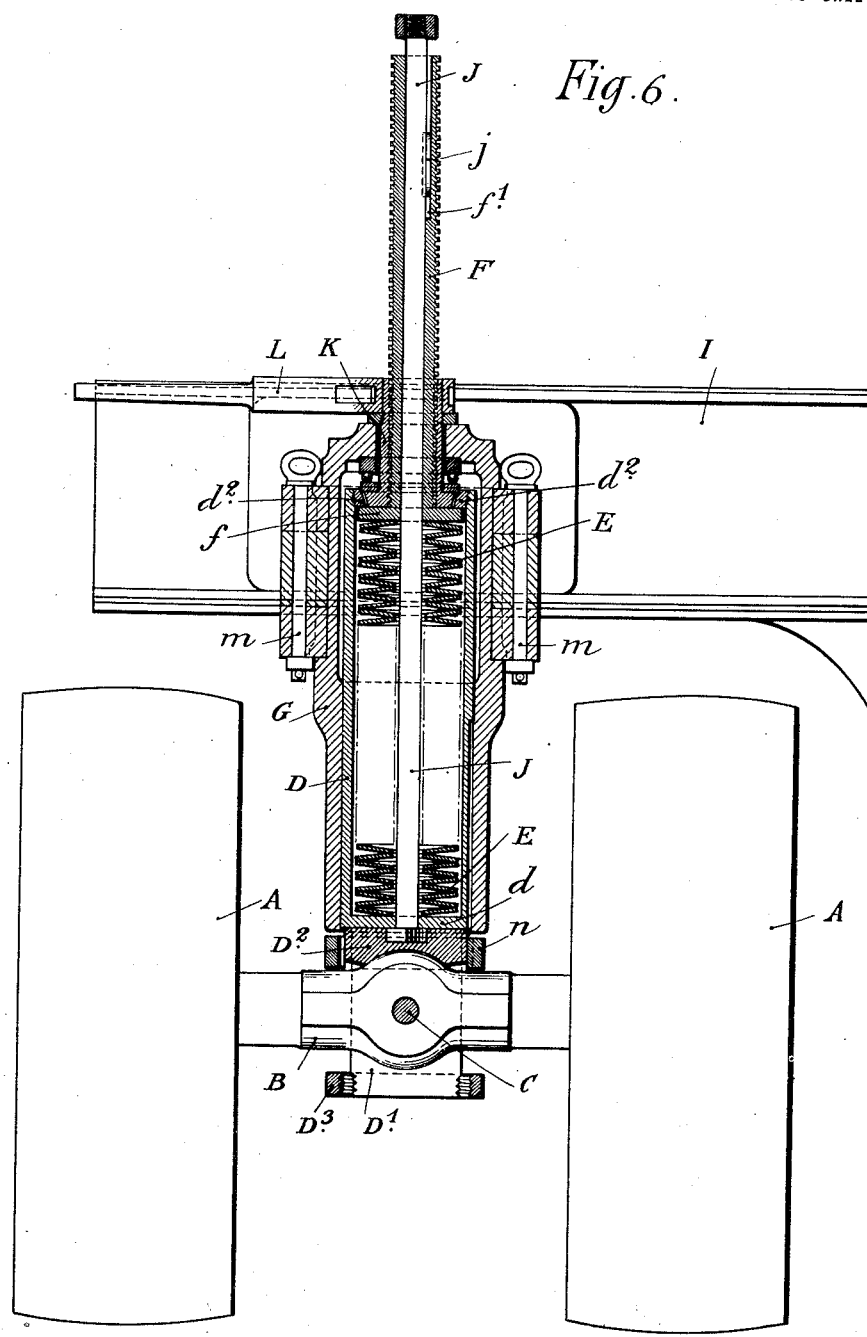

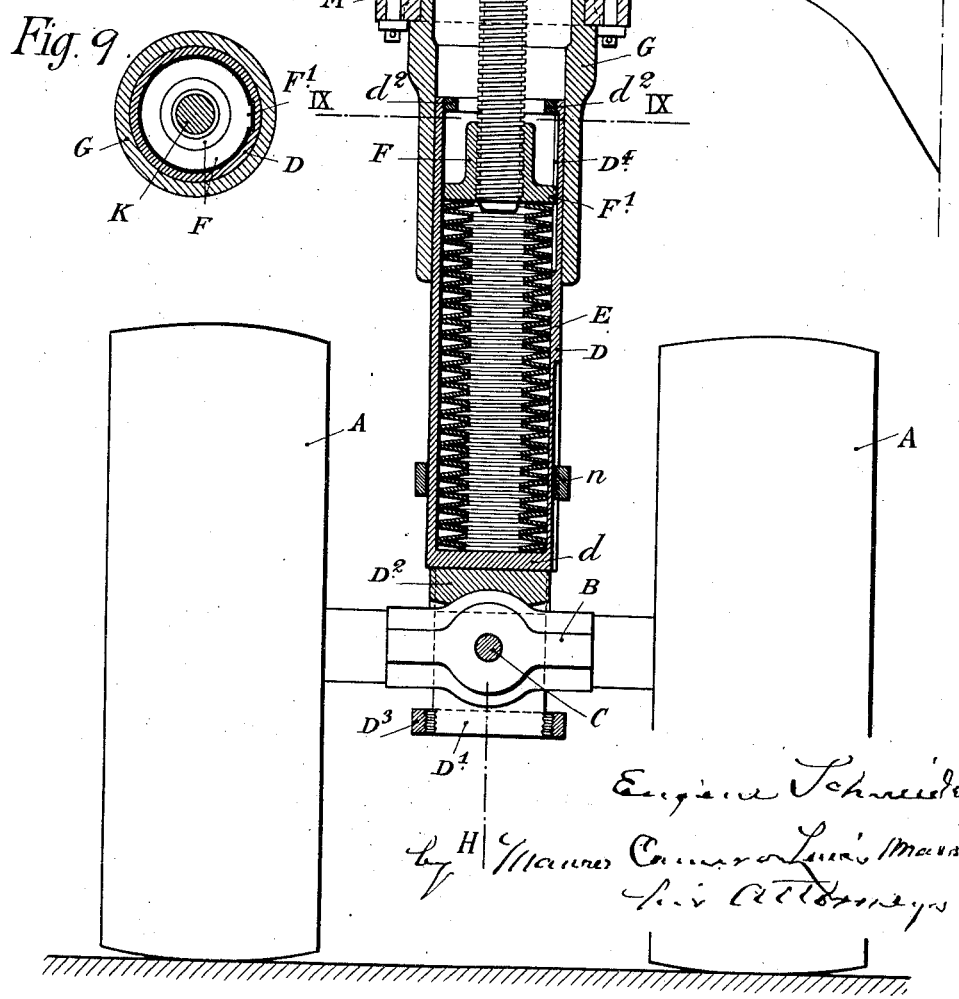

E. SCHNEIDER.
REMOVABLE BOGIE FOR TRAILERS.
APPLICATION FILED JULY 30, 1917.

1,340,414.

Patented May 18, 1920.
6 SHEETS—SHEET 6.

UNITED STATES PATENT OFFICE.

EUGÈNE SCHNEIDER, OF LE CREUZOT, FRANCE, ASSIGNOR TO SCHNEIDER & CIE., OF PARIS, FRANCE, A LIMITED JOINT-STOCK COMPANY OF FRANCE.

REMOVABLE BOGIE FOR TRAILERS.

1,340,414.   Specification of Letters Patent.   Patented May 18, 1920.

Application filed July 30, 1917. Serial No. 183,595.

*To all whom it may concern:*

Be it known that I, EUGÈNE SCHNEIDER, a citizen of the French Republic, residing at Le Creuzot, France, have invented a new and useful Improvement in Removable Bogies for Trailers, Gun-Carriages, and other Apparatus, which is fully set forth in the following specification.

This invention has for its object to provide an improved construction of bogies capable of being adapted to any desired carriage framing, for instance a trailer or a gun carriage, the variable number of bogies constitutes as many elastic suspension devices.

The characteristic feature of the improved bogies is that the bogie axle is connected at its center by a ball and socket joint or a horizontal pin to a member constituting the lower abutment, and it may be also the guide, for an elastic suspension, the upper abutment of which is constituted by one of the essential elements of a screwjack or like device which is capable of pivotation about a vertical axis by means of the support of the other element of the screwjack or by the actual frame of the screwjack in the carriage framing.

This arrangement is such that on suitably operating the screwjacks of the several bogies, the carriage framing may be raised or lowered at will relatively to the ground by bringing the wheels of the bogies to bear upon the ground, or a lifting of the bogies relatively to the carriage framing after the latter has been brought to bear upon the ground; the bearing of the wheels upon the ground being assured besides whatever the contour of the ground during the rolling of the carriage, in the same manner as during the operations.

Some constructional examples of the application of this invention are illustrated in the accompanying drawings.

Figure 1 is a diagrammatic plan of a carriage framing provided by way of example with four bogies according to this invention; the bogies being shown in the positions which they occupy for traveling in a straight line.

Fig. 2 is a similar plan showing the position of the bogies during a turning movement.

Fig. 3 is an end elevation showing the bearing of the pivoted bogies on uneven ground.

Fig. 5 is a corresponding vertical section on the line V—V of Fig. 4.

Fig. 6 is a vertical section similar to that of Fig. 5, the elements of the screwjack combined with the bogie being shown in a different position.

Fig. 7 is a detailed section on the line VII—VII of Fig. 4.

Fig. 8 is a vertical section partly in elevation of a modification of a modified construction of the improved screwjack bogie.

Fig. 9 is a cross section on the line IX—IX of Fig. 8.

Figure 4:
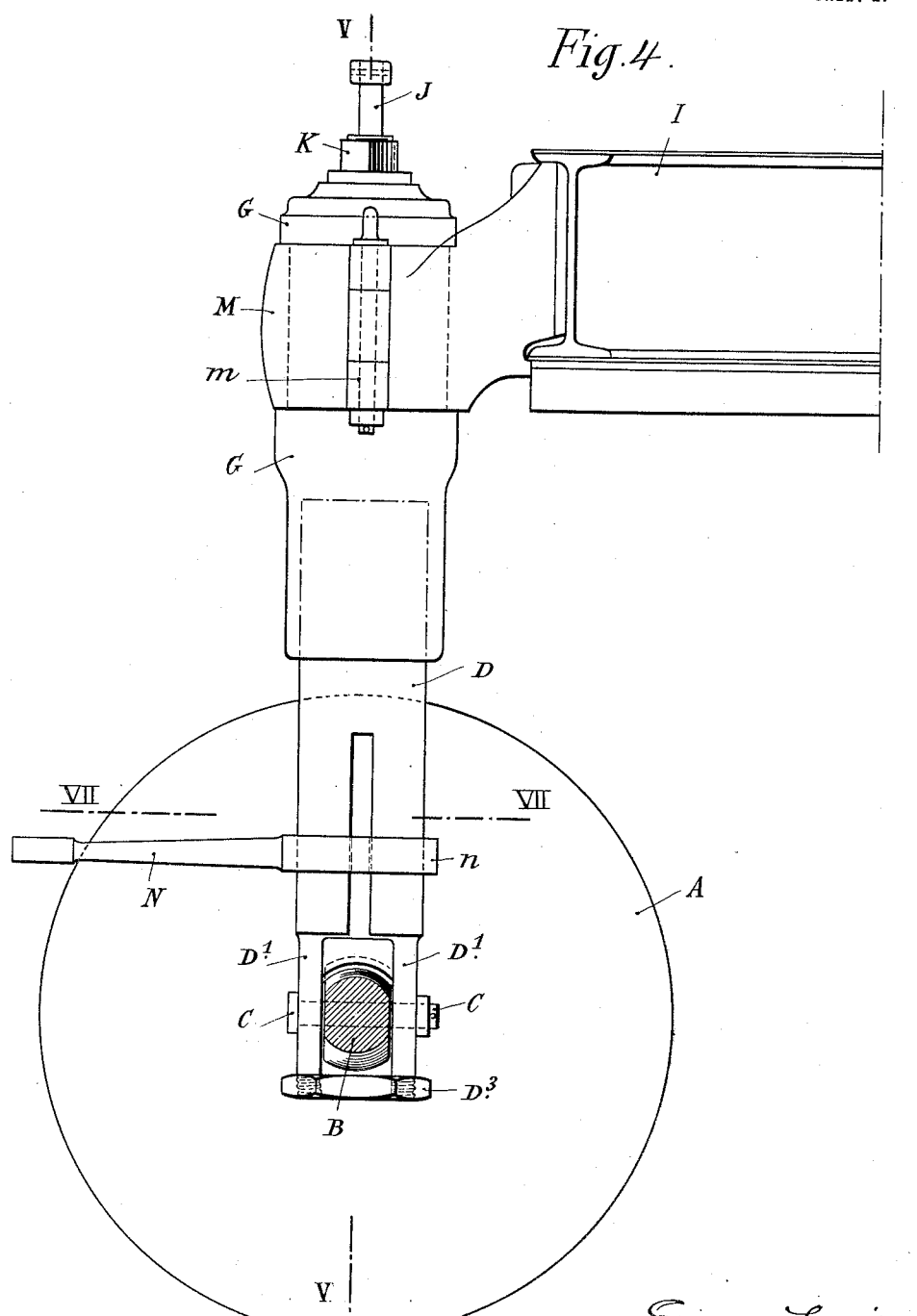
Fig. 4 is an elevation showing the detail of a particular construction of a bogie.

In the constructional examples shown in Figs. 4 to 9, each bogie comprises two wheels A mounted on the ends of an axle B which is pivoted at its middle by a horizontal pin C to a member D constituting the lower abutment for an elastic suspension device E, the upper abutment F of which is constituted by one of the elements of the screwjack.

The frame G of this screwjack, which forms a support for the other element K of the screwjack, constitutes the upper abutment of the suspension device E; it is pivoted in the carriage framing I about a vertical axis H—H located in the plane of the pivotal axis C of the axle.

In the example shown in Figs. 4 to 7, the member D constituting the lower abutment of the elastic suspension device, consists of a socket D the bottom $d$ of which constitutes the abutment proper. The socket D is extended at its lower end in the form of two cheeks $D^1$ that serve to support the horizontal pivot pin C of the axle.

The pivotal movements of the axle are limited by the latter striking against the end surface of a reinforcing member $D^2$ that is screwed or fixed in the socket D, or simply held between the axle and the cheeks $D^1$; the said pivotal movements may also be limited by a collar $D^3$ screwed or fixed on the end of the cheeks $D^1$.

The screwjack combined with the bogie comprises a hollow screw F the lower shoulder $f$ of which forms the upper abutment proper for the suspension spring E. This spring consists in this example of a pile of Belleville washers E held in the socket D and strung on an axial rod J which, by means of a rib or feather $j$, forms the guide for a groove $f^1$ provided in the inside wall of the screw F.

The rod J is fixed in the abutment $d$ of the socket or in the reinforcing member $D^2$, and the mutual guidance between the said rod and the screw F prevents the latter from turning while allowing it to move to a certain extent longitudinally with relation to the rod, in the compression or expansion movements of the spring E.

The other element of the screwjack consists of a nut K which can turn in the frame G and be actuated by means of a lever L. The screwjack frame G may, for the training movements of the axle, turn on the axis H—H, in a collar M carried by the carriage I. This collar may comprise an element fixed to the carriage, and its complementary element jointed to the fixed element by means of hinges $m$. On removing one or other of the hinged pins the collar can be opened into two portions and the screwjack bogie be removed from the framing.

N is a connecting rod for jointing a whiffletree O (Figs. 1 and 2); it can be connected to the socket D by means of an eye $n$ suitably guided by a rib $n^1$ (Fig. 7).

The removable bogies with elastic suspension may as shown in the diagrams Figs. 1 and 2, be mounted in pairs on the ends of a carriage framing or of a gun carriage mount. P is a coupling rod pivoted to the connecting rod N of one of the bogies; it is adapted to be engaged by means of any one of a series of holes $p$ on a pin of the crosspiece $O^1$ (Figs. 1 and 2) for the purpose of locking the connecting rods N of one pair of bogies in a trained position (Fig. 2) or in position for transport (Fig. 1).

Fig. 3 shows the manner in which, owing to the transverse mobility of the axles B, the wheels can be brought to bear at all times firmly upon the ground whatever may be the contour of the latter.

Assuming that the parts of the screwjack bogies are in the position they occupy in Figs. 4 and 5, then starting from that position, the framing I can be raised or lowered at will relatively to the ground within determined limits.

For this purpose it is merely necessary to operate the nuts K suitably by means of the levers L. According to the direction of rotation of the said levers, the framing will be caused to rise or to descend, and the latter, or the gun carriage to which the screwjack bogies are pivoted, can be lowered so as to cause it to bear upon the ground. Then by operating the levers L in such a manner as to cause the screws F to rise relatively to the nuts K, the wheels A may be lifted off the ground. The ends $f$ will then butt against an inner collar $d^2$ of the socket D; then the entity composed of the screw F and socket D will rise in the nut K.

Fig. 6 shows the limit position of lifting the axles while the carriage framing or the gun carriage is resting on the ground.

In the modification shown in Figs. 8 and 9, the lower abutment of the elastic suspension device consists as in the preceding example, of a socket D; the spring E being composed of a pile of Belleville washers. The upper abutment of the spring is here formed by a nut F constituting one of the essential elements of the screwjack of which the frame G is able to turn about the vertical axis H—H in the collar M carried by the framing I.

In this example the nut F moves vertically with relation to the carriage framing on the screw K which can turn in the frame G.

All rotational movement of the nut F is prevented by a rib $F^1$ (Fig. 9) of the said nut being guided in a slot $D^4$ in the socket D.

Fig. 8 shows the position which the parts of the screwjack bogie occupy when the carriage framing is situated near its outermost position from the axles.

Figure 10:
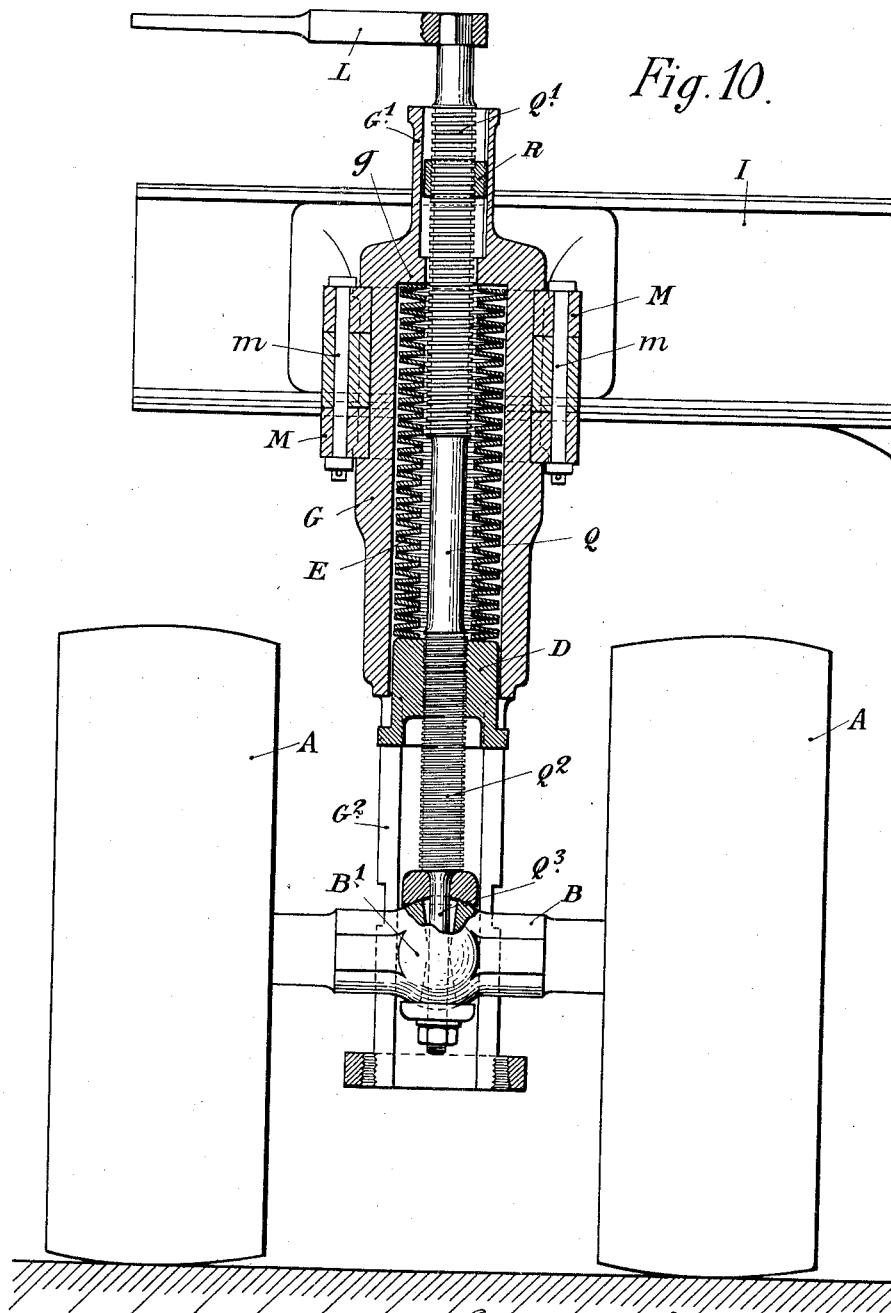
Fig. 10 is a vertical section of a second modification of the screwjack bogie showing the elements of the screwjack in three different positions.

In the example shown in Fig. 10, the lower abutment of the elastic suspension device consists of a nut D mounted on a screwthreaded lower extension $Q^2$ of a spindle Q. The upper part of this spindle has a screw-thread $Q^1$ of greater pitch than that of the screw-thread $Q^2$. The upper abutment of the elastic suspension device consisting of a pile of Belleville washers E, is formed by the end $g$ of the screwjack frame G.

On the screw-thread $Q^1$ there is mounted an abutment nut R which is guided in a tubular extension $G^1$ of the screwjack frame. The operating lever L is in this example mounted on an extension of the spindle $Q$—$Q^1$—$Q^2$.

The axle B is guided between two cheeks $G^2$ fixed to the screwjack frame G. The same cheeks form a guide for the nut D which they prevent from rotating.

The axle B is jointed by means of a ball and socket joint $B^1$ to an extension $Q^3$ of the screw $Q^1$—Q—$Q^2$ of the screwjack.

If on starting from the position shown in Fig. 10, the lever L is operated in the required direction, the screw $Q^2$, in turning, will cause the descent of the nut D as well as the screwjack frame G and the carriage framing I, until the latter has been brought to bear upon the ground; the abutment nut R will then come in contact with the screwjack frame G.

In continuing this movement of the lever L, first the axle is raised, and at the same time an additional compression of the Belleville washers E is produced until the nut D strikes with its lower collar against the lower edge of the screwjack frame G.

What I claim is:—

1. In a bogie for supporting a trailer, gun carriage or other vehicle, a wheeled axle, a vehicle frame and a spring supporting said frame on said axle, a screw-jack having a casing pivotally mounted on said frame and adapted to receive said spring, one of the threaded elements of the jack having a jointed connection with said axle, the companion threaded element of the jack having a connection with said vehicle frame through said screw-jack casing whereby relative movement between the jack elements enables the vehicle frame and the axle to be successively lowered and raised to and from the ground.

2. In a bogie for supporting a trailer, gun carriage or other vehicle, a wheeled axle, a vehicle frame and a spring supporting said frame on said axle, a screw-jack having one threaded element connected with the vehicle frame and the companion threaded element having a jointed connection with said axle whereby relative movement between the jack elements enables the vehicle frame and the axle to be successively lowered and raised to and from the ground.

3. In a bogie for supporting a trailer, gun carriage or other vehicle, a wheeled axle having a spring barrel pivotally mounted thereon, a vehicle frame provided with a tubular member revolubly mounted thereon for receiving said barrel, a nut revolubly mounted on said member, a depressing and elevating screw having threaded engagement with said nut and adapted to connect with said barrel and to be held against rotation thereby, and a suspension spring having the end of the barrel as one abutment and the end of said screw as the opposite abutment.

4. In a bogie for a trailer, gun carriage or other vehicle, the combination of a vehicle frame, a wheeled axle therefor and an elastic suspension device having a loose joint connection with said axle and a pivoted connection with said frame and including means for successively depressing said frame and elevating said axle.

5. In a bogie for a trailer, gun carriage or other vehicle, the combination of a vehicle frame, bogie axle therefor, a spring containing barrel having a loose joint connection with said axle and constituting one abutment for said spring, and screw-jack means having one element revolubly mounted on said frame and the companion longitudinally movable element constituting the opposite abutment for said spring and adapted to move into lifting engagement with said barrel.

6. In a bogie for a trailer, gun carriage or other vehicle, the combination of a wheeled axle, a spring containing barrel having a loose joint connection therewith, a vehicle frame having a removable tubular member revolubly mounted thereon for receiving said barrel, and screw-jack means having one element revolubly mounted on said member and the companion longitudinally movable element serving as one abutment for said spring and adapted to move into lifting engagement with said barrel.

7. In a bogie for supporting a trailer, gun carriage or other vehicle, a wheeled axle, a vehicle frame and a spring supporting said frame on said axle, a spring barrel for receiving and forming one abutment for said spring and provided with depending axle guiding cheeks having pivotal connection with said axle, a screw-jack having a casing revolubly mounted on said frame and adapted to receive said barrel, one threaded element of the jack having connection with the vehicle frame through said revoluble casing and the companion threaded element having connection with said barrel and forming the opposite abutment for said spring.

8. In a bogie for supporting a trailer, gun carriage or other vehicle as defined in claim 7 wherein said cheeks are provided with means for limiting the pivotal movement of said axle.

In testimony whereof I have signed this specification in the presence of two subscribing witnesses.

EUGÈNE SCHNEIDER.

Witnesses:
CHAS. P. PRESSLY,
ANDRÉ MOSTICKER.